United States Patent
Piipponen et al.

(10) Patent No.: US 11,463,965 B2
(45) Date of Patent: Oct. 4, 2022

(54) ADDITIONAL MAXIMUM POWER REDUCTION FOR UPLINK TRANSMISSION FOR WIRELESS NETWORKS

(71) Applicant: Nokia Technologies Oy, Espoo (FI)

(72) Inventors: Antti Piipponen, Helsinki (FI); Vesa Lehtinen, Tampere (FI); Petri Vasenkari, Turku (FI); Jaakko Marttila, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/982,386

(22) PCT Filed: Mar. 28, 2019

(86) PCT No.: PCT/FI2019/050254
§ 371 (c)(1),
(2) Date: Sep. 18, 2020

(87) PCT Pub. No.: WO2019/193249
PCT Pub. Date: Oct. 10, 2019

(65) Prior Publication Data
US 2021/0007059 A1     Jan. 7, 2021

Related U.S. Application Data

(60) Provisional application No. 62/653,423, filed on Apr. 5, 2018.

(51) Int. Cl.
*H04W 52/24* (2009.01)
*H04L 5/00* (2006.01)
(Continued)

(52) U.S. Cl.
CPC ......... *H04W 52/243* (2013.01); *H04L 5/0007* (2013.01); *H04L 5/0039* (2013.01); *H04W 52/146* (2013.01); *H04W 52/36* (2013.01)

(58) Field of Classification Search
CPC .. H04L 5/0073; H04L 5/0007; H04W 52/367; H04W 52/243
(Continued)

(56) References Cited

U.S. PATENT DOCUMENTS 8,743,817 B2   6/2014  Lee et al.
2013/0182661 A1 * 7/2013  Piipponen ........... H04W 52/367
                                                    370/329

(Continued)

FOREIGN PATENT DOCUMENTS

EP      2806595 A1      11/2014
WO   2016/186751 A1    11/2016
WO   2019/097116 A1     5/2019

OTHER PUBLICATIONS

Office action received for corresponding Bangladesh Patent Application No. 63/2019, dated Oct. 12, 2020, 1 page.
(Continued)

Primary Examiner — John J Lee
(74) Attorney, Agent, or Firm — Alston & Bird LLP

(57) ABSTRACT

A technique for power control including receiving, by a user device, a resource block allocation for uplink transmission that includes one or more resource blocks within a frequency channel; determining at least one resource allocation region for which an uplink resource block allocation within the resource allocation region will require an additional maximum power reduction (e.g., to reduce interference to a protected frequency band); and applying, by the user device, the additional maximum power reduction for a transmission power of the user device based on the resource block allocation being within the at least one resource allocation region.

22 Claims, 9 Drawing Sheets

(51) Int. Cl.
   *H04W 52/14* (2009.01)
   *H04W 52/36* (2009.01)
(58) Field of Classification Search
   USPC .............................. 455/452.1, 509, 522, 69
   See application file for complete search history.

(56) References Cited

U.S. PATENT DOCUMENTS

| | | | |
|---|---|---|---|
| 2015/0181517 A1 | 6/2015 | Lee et al. | |
| 2015/0271824 A1 | 9/2015 | Zhang et al. | |
| 2015/0304962 A1 | 10/2015 | Fabien et al. | |
| 2016/0302205 A1* | 10/2016 | Ji | H04W 72/0473 |
| 2016/0345298 A1* | 11/2016 | Frank | H04W 72/04 |

OTHER PUBLICATIONS

"3rd Generation Partnership Project; Technical Specification Group Radio Access Network; NR; User Equipment (UE) Yadio transmission and reception; Part 1: Range 1 Standalone(Release 15)", 3GPP TS 38.101-1, V15.0.0, Dec. 2017, pp. 1-49.
"CR to TS 38.101-1: Implementation of Endorsed Draft CRs from RAN4 #86bis and RAN4 #87", 3GPP TSG-RAN WG4 Meeting #87, R4-1808530, Qualcomm, May 21-25, 2018, 134 pages.
"Co-existence with Narrow Band Systems in the 851-859 MHz Range", TSG-RAN Working Group 4 (Radio) meeting AH-Band 26, R4-B26ah-0020, Agenda : 4.2.6, Ericsson, Jan. 12-19, 2012, 8 pages.
"3rd Generation Partnership Project; Technical Specification Group Radio Access Network; Evolved Universal Terrestrial Radio Access (E-UTRA); User Equipment (UE) radio transmission and reception (Release 15)", 3GPP TS 36.101, V15.0.0, Sep. 2017, 1547 pages.
"Band n41 A-MPR", 3GPP TSG-RAN WG4 Meeting #85, R4-1712448, Agenda : 9.4.3.3.1, Nokia, Nov. 27-Dec. 1, 2017, 4 pages.
International Search Report and Written Opinion received for corresponding Patent Cooperation Treaty Application No. PCT/FI2019/050254, dated May 28, 2019, 16 pages.
"3rd Generation Partnership Project; Technical Specification Group Radio Access Network; Evolved Universal Terrestrial Radio Access (E-UTRA); User Equipment (UE) radio transmission and reception (Release 15)", 3GPP TS 36.101, V15.1.0, Dec. 2017, pp. 1-514.
Lema et al., "MPR-Aware Scheduler for Carrier Aggregation Transmissions in LTE Uplink", Wireless Pers Commun, vol. 84, 2015, pp. 1417-1438.
Tentative rejection received for corresponding Taiwan Patent Application No. 108111532, dated Jan. 7, 2020, 19 pages of office action and 6 pages of Translation available.
Office action received for corresponding Bangladesh Patent Application No. 63/2019, dated Mar. 24, 2020, 1 page.
Office Action received for corresponding Korean Patent Application No. 2020-7031881, dated Sep. 16, 2021, 14 pages of office action and 8 pages of Translation available.
Ericsson, "Band 26: A-MPR for Protection of Adjacent Services", TSG-RAN Working Group 4 (Radio) Meeting #62, R4-120645, (Feb. 6-10, 2012), 12 pages.
Extended European Search Report for European Application No. 19782261.2 dated Dec. 6, 2021, 12 pages.
First Examination Report for Indian Application No. 202047045505 dated Dec. 6, 2021, 7 pages.
Nokia, "A-MPR for CA_41C UL in Power Class 3", 3GPP TSG-RAN WG4 Meeting #83, R4-1705440, (May 15-19, 2017), 10 pages.
Nokia, "A-MPR for N41", 3GPP TSG-RAN WG4 Meeting #87, R4-1808062, (May 21-25, 2018), 10 pages.
Office Action for Korean Application No. 10-2020-7031881 dated Apr. 25, 2022, 4 pages.

* cited by examiner

ADDITIONAL MAXIMUM POWER REDUCTION FOR UPLINK TRANSMISSION FOR WIRELESS NETWORKS

RELATED APPLICATION

This application was originally filed as PCT Application No. PCT/FI2019/050254 on Mar. 28, 2019, which claims priority from U.S. Provisional Application No. 62/653,423, filed on Apr. 5, 2018, which is hereby incorporated in its entirety.

TECHNICAL FIELD

This description relates to communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the $3^{rd}$ Generation Partnership Project (3GPP). A recent development in this field is often referred to as the Long Term Evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node B (eNBs), provide wireless access within a coverage area or cell. In LTE, mobile devices, or mobile stations are referred to as user equipments (UE). LTE has included a number of improvements or developments.

5G New Radio (NR) development is part of a continued mobile broadband evolution process to meet the requirements of 5G, similar to earlier evolution of 3G & 4G wireless networks. A goal of 5G is to provide significant improvement in wireless performance, which may include new levels of data rate, latency, reliability, and security. 5G NR may also scale to efficiently connect the massive Internet of Things (IoT), and may offer new types of mission-critical services.

Some wireless networks provide for power control in the uplink (UL) transmission directions, in which a base station may control the transmission power of a user device or UE.

SUMMARY

According to an example implementation, a method of power control is provided that may use one or more equations and/or inequalities to determine whether an additional maximum power reduction will be used for a user device transmission power for a plurality of channel bandwidths and/or a plurality of resource block bandwidths, the method comprising: receiving, by a user device, a resource block allocation for uplink transmission that includes one or more resource blocks within a frequency channel; determining at least one resource allocation region for which an uplink resource block allocation within the resource allocation region will require an additional maximum power reduction; and applying, by the user device, the additional maximum power reduction for a transmission power of the user device based on the resource block allocation being within the at least one resource allocation region.

According to an example embodiment, a method of power control is provided that may use one or more equations and/or inequalities to determine whether an additional maximum power reduction will be used for a user device transmission power for a plurality of channel bandwidths and/or a plurality of resource block bandwidths, the method comprising: transmitting, by a base station to a user device, a resource block allocation for uplink transmission that includes one or more resource blocks within a frequency channel; providing, by the base station to the user device, at least one resource allocation region for which an uplink resource allocation within the resource allocation region will require an additional maximum power reduction; and determining, by the base station, an additional maximum power reduction for a transmission power of the user device based on the resource block allocation being within the at least one resource allocation region.

According to an example embodiment, a method of power control may be provided. The method may include determining a first resource allocation region for which an uplink resource allocation within the first resource allocation region will require a maximum power reduction for uplink transmission; determining at least a second resource allocation region for which an uplink resource allocation within the second resource allocation region will require an additional maximum power reduction due to a protected frequency band; determining, for a frequency channel, a threshold frequency offset from an edge of the protected frequency band to an edge of the frequency channel, for which additional maximum power reduction will not be required, or a smaller additional maximum power reduction will be required, based on the protected frequency band; determining whether the frequency channel has a frequency offset from the edge of the protected frequency band that is less than the threshold frequency offset; receiving, by the user device, a resource block allocation for uplink transmission that includes one or more resource blocks within the frequency channel; determining, by the user device, whether the resource block allocation is within the at least the second resource allocation region; and, applying the additional maximum power reduction for a transmission power of the user device in response to one or more of (or both of): 1) the resource block allocation is within the at least the second resource allocation region, and 2) the frequency channel has a frequency offset from the edge of the protected frequency band that is less than the threshold frequency offset of the at least the second resource allocation region.

The details of one or more examples of implementations are set forth in the accompanying drawings and the description below. Other features will be apparent from the description and drawings, and from the claims.

DETAILED DESCRIPTION

Figure 1:
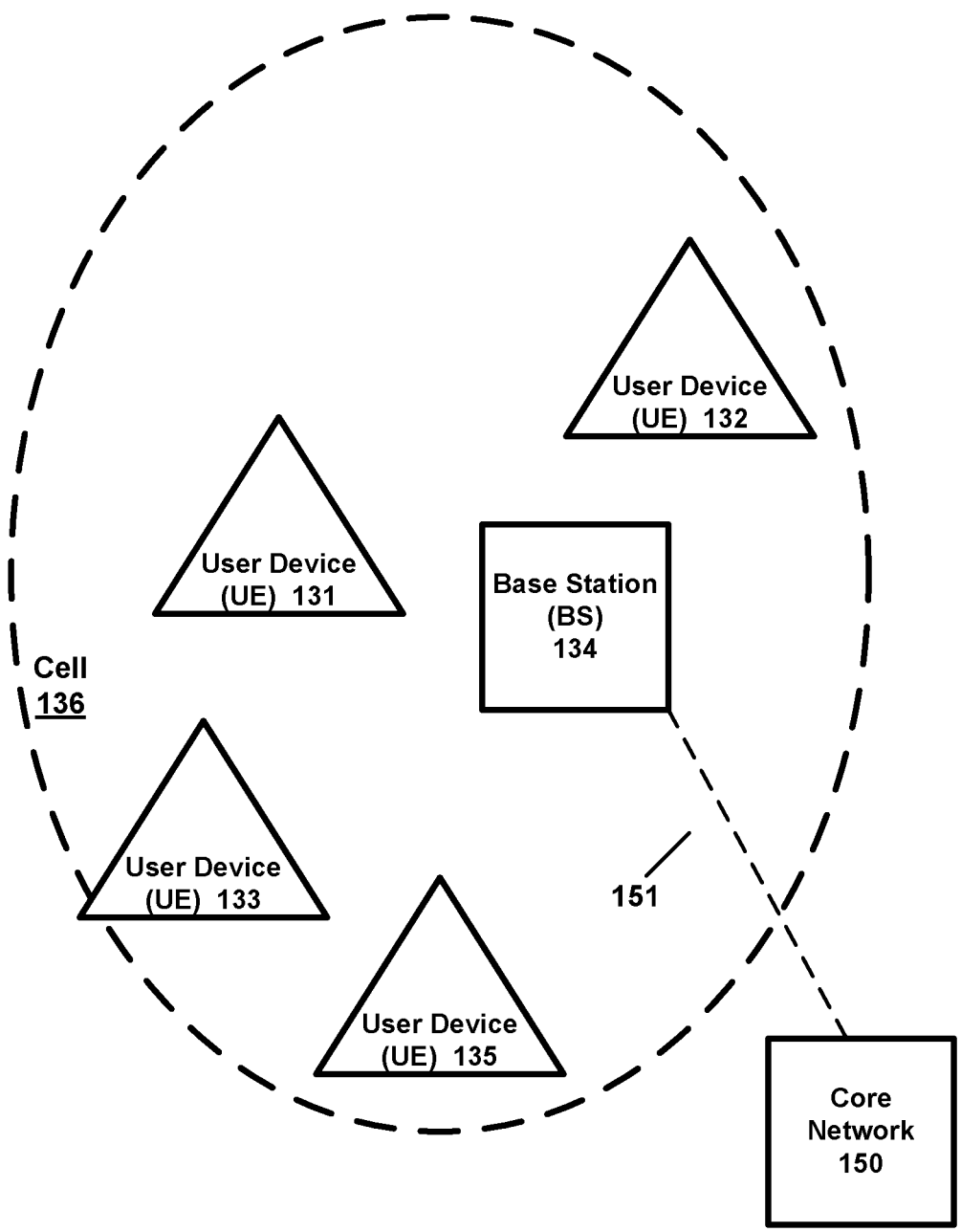
FIG. 1 is a block diagram of a wireless network according to an example implementation.

FIG. 1 is a block diagram of a wireless network 130 according to an example implementation. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), a gNB, or a network node. At least part of the functionalities of an access point (AP), base station (BS) or (e)Node B (eNB) may be also be carried out by any node, server or host which may be operably coupled to a transceiver, such as a remote radio head. BS (or AP) 134 provides wireless coverage within a cell 136, including to user devices 131, 132, 133 and 135. Although only four user devices are shown as being connected or attached to BS 134, any number of user devices may be provided. BS 134 is also connected to a core network 150 via a S1 interface 151. This is merely one simple example of a wireless network, and others may be used.

A user device (user terminal, user equipment (UE) or mobile station) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples. It should be appreciated that a user device may also be a nearly exclusive uplink only device, of which an example is a camera or video camera loading images or video clips to a network.

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

In addition, by way of illustrative example, the various example implementations or techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), Internet of Things (IoT), and/or narrowband IoT user devices, enhanced mobile broadband (eMBB), wireless relaying including self-backhauling, D2D (device-to-device) communications, and ultra-reliable and low-latency communications (URLLC). Scenarios may cover both traditional licensed band operation as well as unlicensed band operation.

IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Communications (MTC, or Machine to Machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing connectivity with reliability corresponding to block error rate (BLER) of $10^{-5}$ and up to 1 ms U-Plane (user/data plane) latency, by way of illustrative example. Thus, for example, URLLC user devices/UEs may require a significantly lower block error rate than other types of user devices/UEs as well as low latency (with or without requirement for simultaneous high reliability).

The various example implementations may be applied to a wide variety of wireless technologies or wireless networks, such as LTE, LTE-A, 5G, cmWave, and/or mmWave band networks, IoT, MTC, eMTC, eMBB, URLLC, etc., or any other wireless network or wireless technology. These example networks, technologies or data service types are provided only as illustrative examples.

Various example implementations relate to power control and Maximum Power Reduction (MPR). According to an example implementation, a power control scheme may be performed between a UE (user device) and a base station (BS). Power control may be used, for example to cause a UE to adjust its uplink transmission power in order for the BS to achieve a minimum signal quality (e.g., signal-to-interference plus noise ratio (SINR)) for received signals from the UE. For example, an open loop or a closed loop power control scheme may be used. A UE may have a maximum transmission power, e.g., 23 dBm, or other power value. A UE may determine its power headroom as a difference between its maximum transmission power and its current transmission power. In some cases, the UE may report its current transmission power, power headroom, and/or maximum transmission power to the BS. In some cases, for example, a UE may use an initial transmission power, and the BS may measure signal quality (e.g., SINR). In an example implementation, a BS may include an uplink grant (or uplink resource allocation) that may include a transmit power control (TPC) command, which may be used to request the UE to increase or decrease its transmission power, e.g., to meet a desired SINR. Power control may also be used to decrease radio interference with other wireless devices and/or to reduce power consumption by the UE. For example, when signal conditions are poor, e.g., due to multi-path fading, a BS may repeatedly request (e.g., via power control commands) the UE to increase its transmission power. Thus, for example, a UE may vary its transmission power within a range up to its maximum transmission power, e.g., based on power control commands from a BS. However, if a UE is already transmitting at its maximum transmission level, this means its power headroom is zero, and the UE is unable to further increase its transmission power.

A maximum power reduction (MPR), or a MPR value, may be a value or an amount that a UE reduces its maximum transmission power. A UE may determine a MPR value, and then may adjust (e.g., decrease) its maximum transmission power by the MPR value, which also decreases its power headroom (e.g., decrease power headroom by the MPR value). The UE may, for example, report to a BS the UE's current transmission power, the UE's (MPR-adjusted) maximum transmission power, and/or the UE's power headroom. Various example implementations may be provided in which maximum power reduction (or a MPR value) may be determined and used by a UE to control (e.g., adjust or decrease) its maximum transmission power. In an example implementation, a UE may control its transmission power, e.g., which may include controlling or adjusting its maximum transmission power, e.g., by determining a maximum power reduction (MPR) value for the UE. Thus, a UE may vary its transmission power, e.g., based on BS power control commands, within a power range up to the (MPR-adjusted) maximum transmission power.

Furthermore, a UE may receive a resource block allocation for uplink transmission that may include one or more resource blocks within a frequency channel (e.g., within a frequency channel assigned to the UE and/or BS). Also, one or more resource allocation regions (e.g., an inter-modulation or IMD3 region and/or regrowth region) may be indicated or determined for which a resource block allocation within the resource allocation region will (or may) require an additional maximum power reduction for the UE in order to reduce interference to a protected frequency band.

As noted, a maximum power reduction (MPR) may be applied to a user device for uplink transmissions, e.g., in which a maximum transmission power may be reduced for a UE/user device. In addition, an additional (or further) maximum power reduction may be applied for UE/user device transmission power based on one or more conditions, such as: 1) the resource block allocation (resource blocks allocated to the UE for uplink transmission) is within the resource allocation region, or 2) the frequency channel has a frequency offset from an edge of the protected frequency band that is less than a threshold frequency offset of the resource allocation region. For example, a frequency offset of the frequency channel may be measured from an edge of the protected frequency band to an edge of the frequency channel of the UE. Thus, for example, in some cases, no additional MPR (or less additional MPR) may be applied (or may be necessary) to the UE in a case where the frequency channel (assigned to the UE and BS for communication) is a sufficient distance (e.g., at least a threshold frequency offset away) from the edge of the protected frequency band.

According to an example implementation, a method of power control is provided that uses one or more equations and/or inequalities to determine whether an additional maximum power reduction will be used for a user device transmission power for a plurality of channel bandwidths and/or a plurality of resource block bandwidths, the method comprising: receiving, by a user device, a resource block allocation for uplink transmission that includes one or more resource blocks within a frequency channel; determining at least one resource allocation region for which an uplink resource block allocation within the resource allocation region will require an additional maximum power reduction to reduce interference to a protected frequency band; and applying, by the user device, the additional maximum power reduction for a transmission power of the user device based on the resource block allocation being within the at least one resource allocation region.

In an example embodiment, the applying may include: applying, based on the following: 1) the resource block allocation is within the at least one resource allocation region, and 2) the frequency channel has a frequency offset from an edge of the protected frequency band that is less than a threshold frequency offset of the at least one resource allocation region.

In an example embodiment, an amount of additional maximum power reduction applied by the user device is a function of the frequency offset of the frequency channel.

In an example embodiment, a larger additional maximum power reduction (A-MPR) is applied by the user device for a smaller frequency offset, and a smaller additional maximum power reduction is applied by the user device for a larger frequency offset of the frequency channel.

In an example implementation, each resource allocation region may have an associated threshold frequency offset. Also, allocation region borders (e.g., defining a location and/or resource blocks/resources) of an allocation region), a threshold frequency offset and an (amount of) additional maximum power reduction are defined for each of a plurality of resource allocation regions. Also, for example, each threshold frequency offset may be based upon a bandwidth of the frequency channel.

According to an example embodiment, the applying the additional maximum power reduction may include controlling, by the user device, a transmission power of the user device for uplink transmission via the resource block allocation by reducing the maximum transmission power of the user device by the additional maximum power reduction. Or, the applying the additional maximum power reduction may include determining an adjusted maximum transmission power based on the maximum power reduction, and controlling, by the user device, the transmission power of the user device for uplink transmission within a power range that is less than or equal to the maximum transmission power.

According to an example embodiment, the resource allocation region may include, for example, a resource allocation region (e.g., IMD3 region) in which transmission power of the user device is limited by intermodulation distortion to reduce interference to the protected frequency band; and/or a resource allocation region (e.g., a spectral regrowth region) in which transmission power of the user device is limited by spectral regrowth to reduce interference to the protected frequency band.

Figure 2:
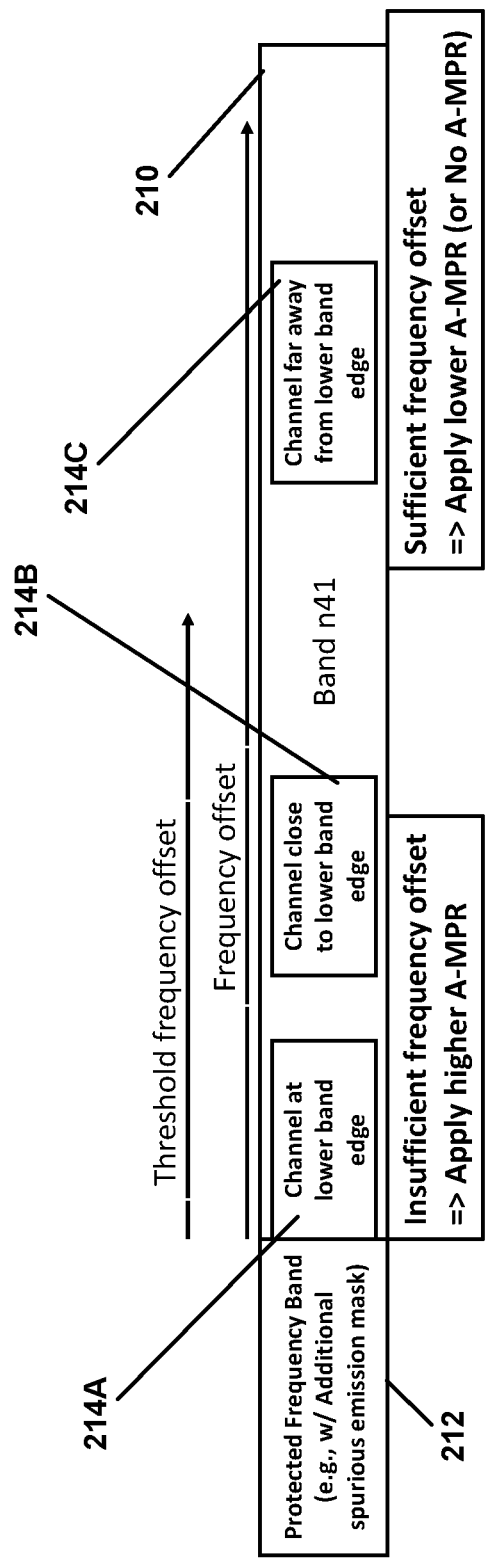
FIG. 2 is a diagram illustrating frequency channels having different frequency offsets with respect to an edge of a protected frequency band according to an example embodiment.

FIG. 2 is a diagram illustrating frequency channels having different frequency offsets with respect to an edge of a protected frequency band according to an example embodiment. A frequency band (e.g., band n41 or other band) may be available for an operator to use for wireless/radio transmissions. A different frequency channel may be allocated to each of a plurality of different BSs. A frequency channel may have a selected bandwidth (e.g., 5 MHz, 10 MHz, 15, MHz, 20 MHz, 25 MHz, . . . 100 MHz). Also, for example, resource blocks may have a selected size or resource block width (RBW) (e.g., in an OFDM system, a given number of subcarriers with a given subcarrier spacing), such as 180 kHz, 360 kHz, or other resource block width (RBW). Thus, for example, a 20 MHz channel may have 106 resource blocks (RBs), with each resource block having a resource block width (RBW) of 180 kHz, as an illustrative example. In another example, a 100 MHz channel may use a 360 kHz resource block width.

Each BS and/or cell may be assigned a frequency channel to perform uplink and/or downlink transmissions with a set of UEs. A frequency channel may be a set (e.g., a subset) of frequency resources/resource blocks within band 210, that may be assigned to a BS, for example. Each resource block may include a group of one or more subcarriers or frequency resources. For example, frequency channel 214A may be assigned or allocated to BS1, frequency channel 214B may be assigned to BS2, frequency channel 214C may be assigned to BS3, etc. Each BS may then allocate the resources (e.g., resource blocks) of its assigned channel to various UEs for uplink transmission and/or use various resources within its assigned channel for downlink transmission, as needed.

Also, although not shown in FIG. 2, each UE within a cell may be allocated a resource block allocation, e.g., which may be a portion of the frequency channel for the BS (e.g., a subset or group of the resource blocks of the channel) for uplink (UL) transmission, e.g., depending on the needs of the UE and/or based on the amount of data that the UE may have to transmit, or other criteria. For example, of the 106 RBs within a 20 MHz frequency channel, a UE may receive a resource block allocation of 10 RBs for uplink transmission. This is merely an illustrative example, and other channel bandwidths and/or different sizes of resource block allocations and/or different resource block widths (RBSs) may be used.

According to an example embodiment, a protected frequency band 212 may be provided adjacent (in frequency, with the X (or horizontal) axis of FIG. 2 being frequency) to the band 210. Protected frequency band 212 may include a band or range of frequencies that may be subject to an additional spurious emissions mask, which may provide additional limits on interference or spurious emissions to (or into) the protected frequency band 212.

According to an example embodiment, each frequency channel 214A, 214B, 214C, etc., within band 210 may have a frequency offset with respect to an edge (e.g., lower edge) of protected frequency band 212. Thus, frequency offset of a frequency channel may be the distance or frequency between an edge or reference point (e.g., the lower edge, corresponding to a lowest frequency) of protected frequency band 212 and a reference point or reference edge of the frequency channel (e.g., upper edge, lower edge, or center frequency at a center or middle of the frequency channel). These are merely some example reference points that may be used to measure frequency offset of a frequency channel with respect to the protected frequency band, and other reference points or edges may be used. For example, channel 214A may have a frequency offset of 0 Hz because channel 214A is adjacent to the protected frequency band 212 (e.g., if a frequency offset of channel 214A is indicated or measured as a frequency difference between a lower edge of protected frequency band 212 and an upper edge of the channel 214A). A frequency offset with respect to protected frequency band 212 may be similarly measured or indicated for each of the other frequency channels, such as for frequency channels 214B, 214C, etc.

According to an example embodiment, a location of a frequency channel with respect to (e.g., with respect to a lower edge of) protected frequency band 212 may be used as a basis to determine whether a transmission via a resource block allocation(s) within the frequency channel may be subject to an additional maximum power reduction (additional MPR), e.g., to reduce interference to the protected frequency band 212 and/or to ensure that the additional spurious emissions mask associated with (or applied to) protected frequency band 212 is not violated.

According to an example embodiment, a (relative) location of a frequency channel with respect to the protected frequency band 212 may, for example, be represented or indicated by a frequency offset of the frequency channel with respect to the protected frequency band 212. According to an example embodiment, a UE UL transmission via resources within a frequency channel that is sufficiently far away from the protected frequency band 212 will not interfere with the protected frequency band 212 (e.g., will not cause spurious emissions that may violate the spurious emissions mask associated with the protected frequency band 212). Also, for example, in some cases, even if a resource block allocation is within a resource allocation region (e.g., IMD3 region), additional MPR (A-MPR) may not be applied (or may not be necessary), or a lower A-MPR may be applied, if the frequency channel (where the resource block allocation is provided) has a frequency offset that is greater than or equal to the threshold frequency offset.

According to an example embodiment, a threshold frequency offset 216 may be used to determine whether additional MPR should be used or applied to a UE that is performing an UL transmission via resources within the frequency channel. For example, additional MPR may be applied for transmissions via resource block allocations that are within frequency channels that have a frequency offset that is less than the threshold frequency offset 216, such as for frequency channels 214A and 214 B. Thus, any transmissions by a UE within resources of frequency channels 214A and/or 214B will require additional MPR (or a larger additional MPR) because such frequency channels 214A and 214B are relatively close or near the protected frequency band 212 (and thus more likely to interfere with the protected frequency band 212). On the other hand, any UE uplink transmission via resources of frequency channel 214C will not need additional MPR (or may only need a smaller additional MPR) because such frequency channel 214C is further away from protected frequency band 212 (and thus, will not interfere with or less likely to interfere with protected frequency band 212). In this manner, by way of these illustrative examples, a location (e.g., a frequency offset) of a frequency channel with respect to (e.g., with respect to a lower edge of) protected frequency band 212 may be used as a basis to determine whether a transmission via a resource block allocation(s) within the frequency channel may be subject to an additional maximum power reduction (additional MPR). Backoff (or power backoff) may also be used to refer to MPR or additional MPR.

According to an example embodiment, there may be one or more resource allocation regions for which an uplink resource block allocation within the resource allocation region will require an additional maximum power reduction to reduce interference to the protected frequency band 212. An example resource allocation region may include a resource allocation region in which transmission power of a UE is limited (or should be limited) by intermodulation distortion to reduce interference to the protected frequency band 212. This resource allocation region may be referred to as an intermodulation distortion (IMD) region, or a third order intermodulation distortion (IMD3) region. IMD (intermodulation distortion) results from mixing of two or more signals of different frequencies, and a spurious or unwanted signal output may occur at the sum and/or differences of integer multiples of the input frequencies. For example, in many cases IMD can be filtered out. However, if the input frequencies are very close in frequency, then the third order IMD will be very close to the fundamental frequencies and cannot be easily filtered out. Thus, IMD3 region may refer to the spurious emissions due to the IMD3, which may cause the maximum transmission power to be reduced to avoid interference with a protected frequency band.

Another example of a resource allocation region may include a resource allocation region in spectral regrowth may cause a spurious emission, and where a transmission power of a UE is or should be limited due to this spectral regrowth to reduce interference with the protected frequency band 212. This type of resource allocation region may be referred to as a regrowth region or spectral regrowth region. For example, spectral regrowth may include signals from intermodulation products generated in the presence or based upon a digital transmitter added to an analog communication system. Other resource allocation regions may be present or may be used, e.g., such as a counter IMD3 region. For example, when a resource block allocation is provided on one side of a frequency channel, then a counter IMD3 region (or counter IMD3 emission) may appear or occur at the opposite end of the frequency channel. Other resource allocation regions may also be used to cause a maximum power reduction.

Figure 3:
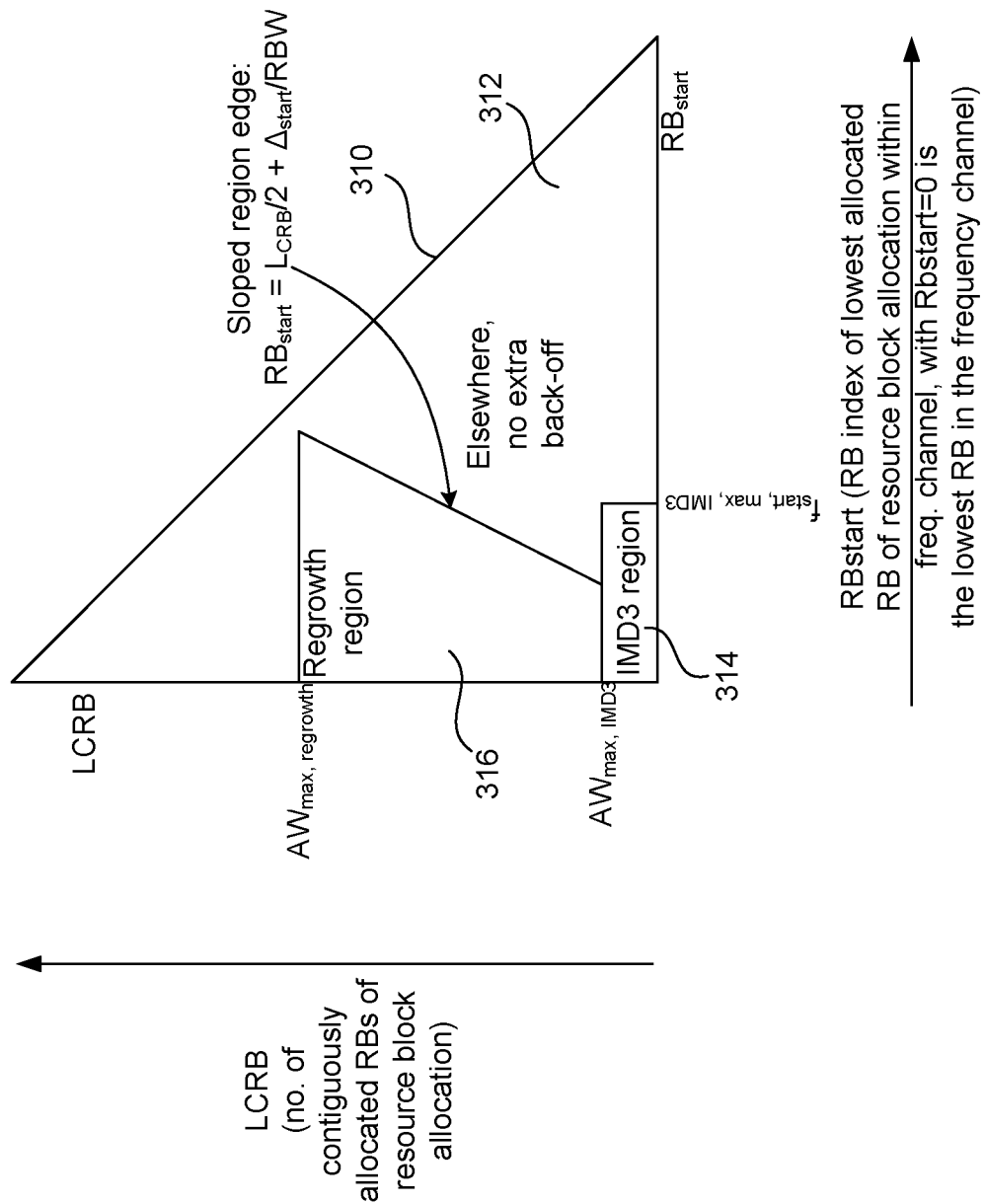
FIG. 3 is a diagram illustrating resource allocation regions in which additional maximum power reduction is applied according to an example embodiment.

FIG. 3 is a diagram illustrating resource allocation regions in which additional maximum power reduction is applied according to an example embodiment. A size (number of resource blocks of the resource block allocation) and location (e.g., which may be indicated by a starting RB index) of a resource block allocation within a frequency channel may indicate whether the resource block allocation is within one or more of the resource allocation regions in which additional maximum power reduction is applied. In FIG. 3, the horizontal or X axis is RBstart, which is the RB (resource block) index of the lowest allocated RB of the resource block allocation within the frequency channel, where RBstart=0 is the lowest RB in a frequency channel. In FIG. 3, the vertical or Y axis is LCRB, which is the length or number of contiguously allocated resource blocks (RBs) of the resource block allocation.

Two example resource allocation regions are shown, including a IMD3 region 314, and a regrowth region 316, where a resource block allocation within either of these regions (314, 316) will cause additional MPR to be applied (maximum transmission power of the UE to be reduced) to an uplink transmission via such resource block allocation, e.g., to avoid interference with the protected frequency band 212, for example.

According to an example embodiment, referring to FIG. 3, a maximum power reduction (e.g., of 1 dB) may be applied to transmissions via resources that are provided within triangle 310. For example, only MPR is performed (no additional MPR) for transmissions via resource block allocations that are within gray region 312 (and outside of regions 314, 316). On the other hand, additional (or further) MPR is (or may be) applied or performed for uplink transmissions via resource block allocations that are within either IMD3 region 314 and/or within regrowth region 316, e.g., to avoid interference with protected frequency band 212 (which may include an additional spurious emission mask).

According to an example embodiment, resource allocation region borders, a threshold frequency offset, and an additional MPR value (e.g., 1.5 dB, 2.5 dB or other MPR value) may be defined for each resource allocation region (e.g., for each of IMD3 region 314, and regrowth region 316). For example, the height (Y axis) of the IMD3 region is the allocation bandwidth (BW) of the IMD3 region, and is shown as A $W_{max, IMD3}$. Likewise, $f_{start, max, IMD3}$ is the X axis width (or number of resource blocks) of the IMD3 region 314. Thus, A $W_{max, IMD3}$ and $f_{start, max, IMD3}$ are the resource allocation region borders for the IMD3 region. Similarly, the values or parameters A $W_{max,regrowth}$ determines the height or Y axis value ($L_{CRB}$), or number of contiguous resource blocks, of the regrowth region 316, and the $RB_{start}$ or X axis location or $RB_{start}$ for the regrowth region 316 is indicated by the sloped region edge, which is defined by the equation: $RB_{start}=L_{CRB}/2+\Delta_{start}/RBW$, where RBW is resource block width (for which there may be multiple alternative values for each channel bandwidth or for different resource block sizes or different subcarrier spacings), where LCRB/2 indicates the slope of that sloped region edge, $\Delta_{start}$ refers to right edge of the regrowth region 316, and RBW refers to the resource block width, which may vary for different channel BWs and/or different RB sizes or widths, etc. By way of illustrative example, if a resource block contains 12 subcarriers, hence RBW=12·SCS, where SCS is subcarrier spacing, thus for 15 kHz SCS, RBW equals 180 kHz.

As noted, a different additional MPR may be applied for a transmission via a resource block allocation that is within IMD3 region 314 and/or within regrowth region 316. Thus, for example, a MPR of 1 dB may be applied to any resource block allocation within triangle 310. And, an additional MPR (in addition to the MPR of 1 dB) may be applied or used for a transmission via a resource block allocation that is within one of the resource allocation regions 314, 316. For example, an additional MPR of 1.5 dB may be applied to any resource block allocation that is within IMD3 region 314 (resulting in a total MPR of 2.5 dB for resource block allocations within IMD3 region 314), while an additional MPR of 2.5 dB may be applied to any resource block allocation that is within regrowth region 316 (resulting in a total MPR of 3.5 dB for resource block allocations within regrowth region 316). Or, if the resource block allocation region is within the triangle 310 (FIG. 3), but is outside of regions 314 and 316 (thus additional MPR is not applied), then only the MPR value of 1.0 dB would be applied to transmissions via such resource block allocation, according to an example embodiment.

Thus, both the UE and a BS may determine an additional maximum power reduction (or additional MPR value) for a transmission power of the user device based on at least one of the following: 1) the resource block allocation is within the at least one resource allocation region (e.g., within either IMD3 region 314 or regrowth region 316, or other resource allocation region, see FIG. 3), and/or 2) the frequency channel has a frequency offset from an edge of the protected frequency band 212 that is less than a threshold frequency offset of the at least one resource allocation region (e.g., see FIG. 2) (as noted, each resource allocation region may have an associated threshold frequency offset).

When defining the requirements of any band, such as band n41 or other frequency band, typically some additional emission requirements may apply. The generic MPR may cover (or be applied to) a large part of the band, but in some cases, additional MPR may be required to keep out-of-band or spurious emissions below band-specific limits, for example. For example, for band n41, the emissions limits may be tighter or more strict, and MPR may not be sufficient. Thus, it may be necessary to apply additional MPR in some cases or situations, as described herein, to meet the stricter emissions limits, such as to meet requirements of an additional spurious emissions mask that may be used to protect a (nearby) protected frequency band 212. A maximum power transmission, for example, may be 23 dBm, and MPR and additional MPR may be applied to reduce or decrease the maximum power transmission in some cases or situations. As an illustrative example, additional MPR may be applied for frequency channels that have a relatively small frequency offset (e.g., less than a threshold frequency offset), for small resource block allocations close to the channel edge, and/or for relatively large resource block allocations. These are merely some examples, and other examples may be used or provided.

Rather than providing a table (or tables) that indicate additional MPR for a variety of different situations, e.g., for different channel BWs, different resource block widths (RBWs) (e.g., for different subcarrier spacings) or for other various conditions or parameters (which may require significant bandwidth to transmit to a UE and/or require significant memory space to store such tables), a method of power control may be provided herein that may use one or more equations or inequalities to determine whether additional maximum power reduction is required or will be provided for a user device transmission power, e.g., for a plurality of frequency channel bandwidths and/or a plurality of resource block bandwidths. Thus, a flexible A-MPR (additional maximum power reduction) determination may be performed or used by the UE and/or BS based on a set of equations and/or inequalities (e.g., known by both the BS and UE), for a variety of different conditions, e.g., such as for different frequency channel bandwidths and/or for different resource block widths, for example, which may conserve transmission resources and/or reduce the amount of memory required to store such equations and/or inequalities, as compared to using a group of tables that may identify A-MPR for such a variety of different conditions or situations.

Figure 4:
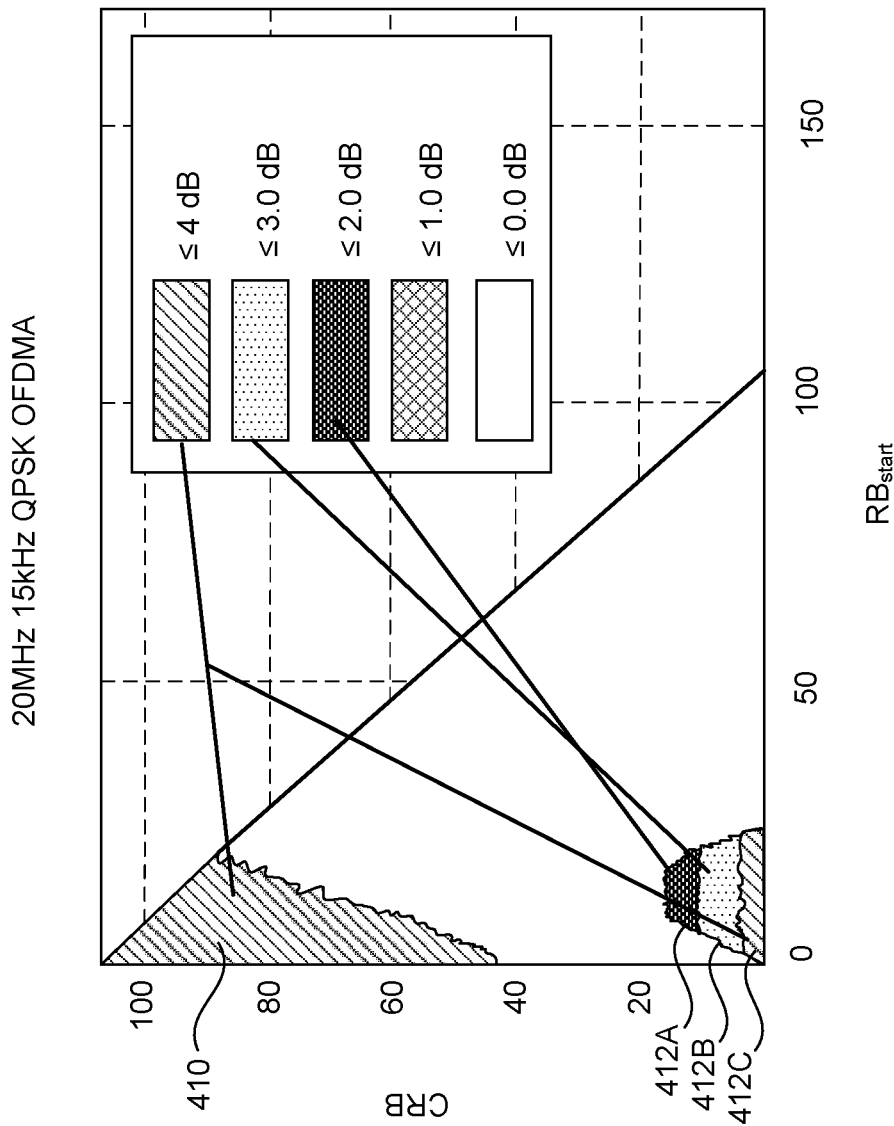
FIG. 4 is a diagram illustrating additional maximum power reduction (A-MPR) values applied for different sizes and/or locations of a resource block allocation according to an example embodiment.

FIG. 4 is a diagram illustrating additional maximum power reduction (A-MPR) values applied for different sizes and/or locations of a resource block allocation according to an example embodiment. In FIG. 4, a zero frequency offset for the frequency channel is assumed. The example shown in FIG. 4 is for a 20 MHz frequency channel with a 15 kHz subcarrier spacing (or 180 kHz resource block width). An example regrowth region 410 and an example IMD3 region is shown (including sub-regions 412A, 412B, 412C). Different A-MPR values are shown for: regrowth region 410 (A-MPR≤4 dB); IMD3 sub-region 412A (A-MPR≤2 dB); IMD3 sub-region 412B (A-MPR≤3 dB); and IMD3 sub-region 412C (A-MPR≤4 dB).

Figure 5:
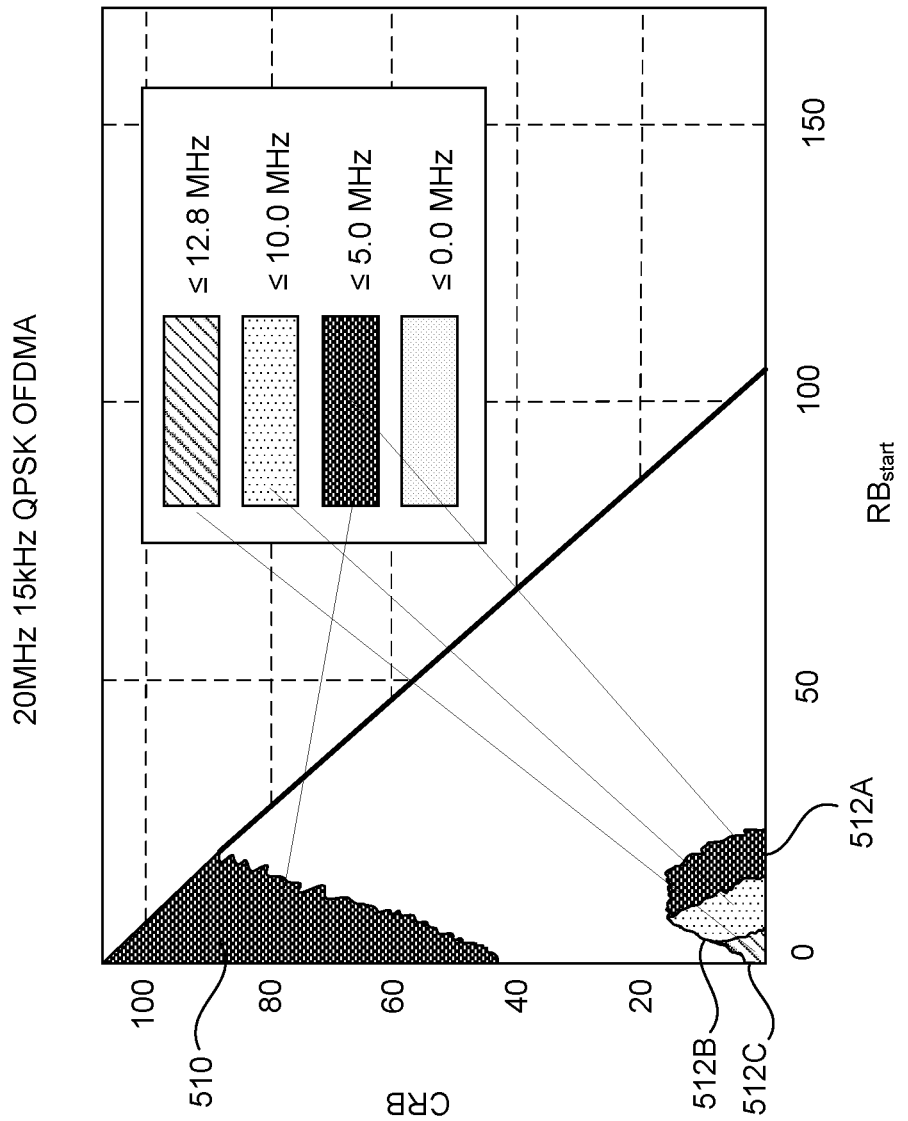
FIG. 5 is a diagram illustrating a frequency offset that may be required to avoid additional maximum power reduction (A-MPR) according to an example embodiment.

FIG. 5 is a diagram illustrating a frequency offset that may be required to avoid additional maximum power reduction (A-MPR) according to an example embodiment. Resource allocations within region 510 (which may be a regrowth region) may require frequency offset≤5 MHz to avoid A-MPR; resource allocations within sub-region 512A may require a frequency offset≤5 MHz); resource allocations within sub-region 512B may require a frequency offset≤10 MHz); and, resource allocations within sub-region 512C may require a frequency offset≤12.8 MHz).

Some example embodiments may include one or more of the following: According to an example embodiment, the frequency offset required to avoid A-MPR is small, up to 10 MHz, in the regrowth region. The region borders and frequency offsets can be expressed as very simple functions of the channel bandwidth or as constants. Also, according to an example embodiment, to simplify the A-MPR rule, use a parametrization common for all RBWs (resource block bandwidths): express the region borders in Hz. The maximum $RB_{start}$ in the IMD3 region is approximately proportional to channel bandwidth. This is caused by the fact that the maximum distance of a narrow allocation and its image is approximately proportional to the channel bandwidth. The maximum allocation width of the IMD3 region can be defined as a constant in Hz. At larger allocation widths, the IMD3 peak stays below the additional spurious limit. In the IMD3 region, the frequency offset required to avoid A-MPR decreases by 3N·RBW when $RB_{start}$ is increased by N RB. This does not depend on the power amplifier, for example. When the allocation moves N RB towards the channel center, so does the image. As a result, the IMD3 peak shifts by 3N RBs towards the channel center. Also, for example, the expression LCRB/2 may define the slope of the right-hand border (or right hand edge) of regrowth region. Also, for example, the border may be shifted horizontally by an amount that depends on the channel bandwidth. The expression LCRB/2 provides the slope of the edge of the regrowth region. A constant upper limit (in Hz) may be defined for $L_{CRB}$ in the regrowth region. A constant, e.g., 10 MHz frequency offset may be defined for the regrowth region. For example, in some cases, 10 MHz may be the smallest NR (5G) channel bandwidth permitted in band n41, hence defining a smaller offset for OFDM would give little benefit, at least in some cases. In some cases, we may use the same A-MPR value for each A-MPR region, channel bandwidth, and resource block bandwidth (or RBW), and define the A-MPR separately for each combination of modulation and multiple access scheme.

According to an example embodiment, a set of rules or a set of equations and inequalities may be used to determine A-MPR for a variety of different situations, e.g., for different channel bandwidths and/or different RB widths, may be summarized as follows:

If a resource block allocation is within the IMD3 region and frequency offset of frequency channel is insufficient (e.g., frequency offset is smaller than a threshold), if the frequency channel is at an upper edge, then it is far enough away and emissions limits do not apply, but a channel at lower edge or near protected frequency band 212 has strict emissions limits, then apply higher back-off (apply A-MPR), else, if allocation is within the regrowth region and frequency offset of frequency channel is insufficient (is less than the threshold), then apply higher back-off (apply A-MPR), else, apply lower back-off (e.g., use just MPR, with no A-MPR, or with lower A-MPR).

Example Proposal: The back-off (max. power reduction) may be defined as max(MPR, A-MPR). Given the parameters defined in Table 1 and symbol definitions in Table 2, if $RB_{start} \le f_{start,max,IMD3}/RBW$ (if $RB_{start}$ is small enough—if location of RB start (first RB of allocation) within frequency channel is inside IMD3 region, since first RB of allocation is closest to the IMD3 region);

and $L_{CRB} \le A\ W_{max,IMD3}/RBW$ (If $L_{CRB}$ is small enough, then allocation is within Y axis of IMD3—both of these are indications that the allocation is within IMD3);

and $F_C - BW_{Channel}/2 < F_{UL\_low} + \text{offset}_{IMD3}$, (frequency offset of the channel is not sufficient to avoid A-MPR, thus the frequency offset of channel is not sufficient to prevent allocation from being within IMD3);

then the A-MPR is defined according to Table 3, (also, if allocation is outside of IMD3, then no A-MPR, or if frequency channel is pushed up beyond a threshold frequency offset, then allocation within the channel cannot be near band, then if any of these are met, then A-MPR is not required).

else, if $RB_{start} \leq L_{CRB}/2 + \Delta_{start}/RBW$ and $L_{CRB} \leq A\ W_{max,regrowth}/RBW$ and $F_C - BW_{Channel}/2 < F_{UL\_low} + \text{offset}_{regrowth}$,
then
the A-MPR is defined according to Table 3
else,
A-MPR=0.

and $L_{CRB} \leq A\ W_{max,regrowth}/RBW$
and $F_C - BW_{Channel}/2 < F_{UL\_low} + \text{offset}_{regrowth}$,
then
the A-MPR is defined according to Table 3,
else,
A-MPR=0.

Figure 6:
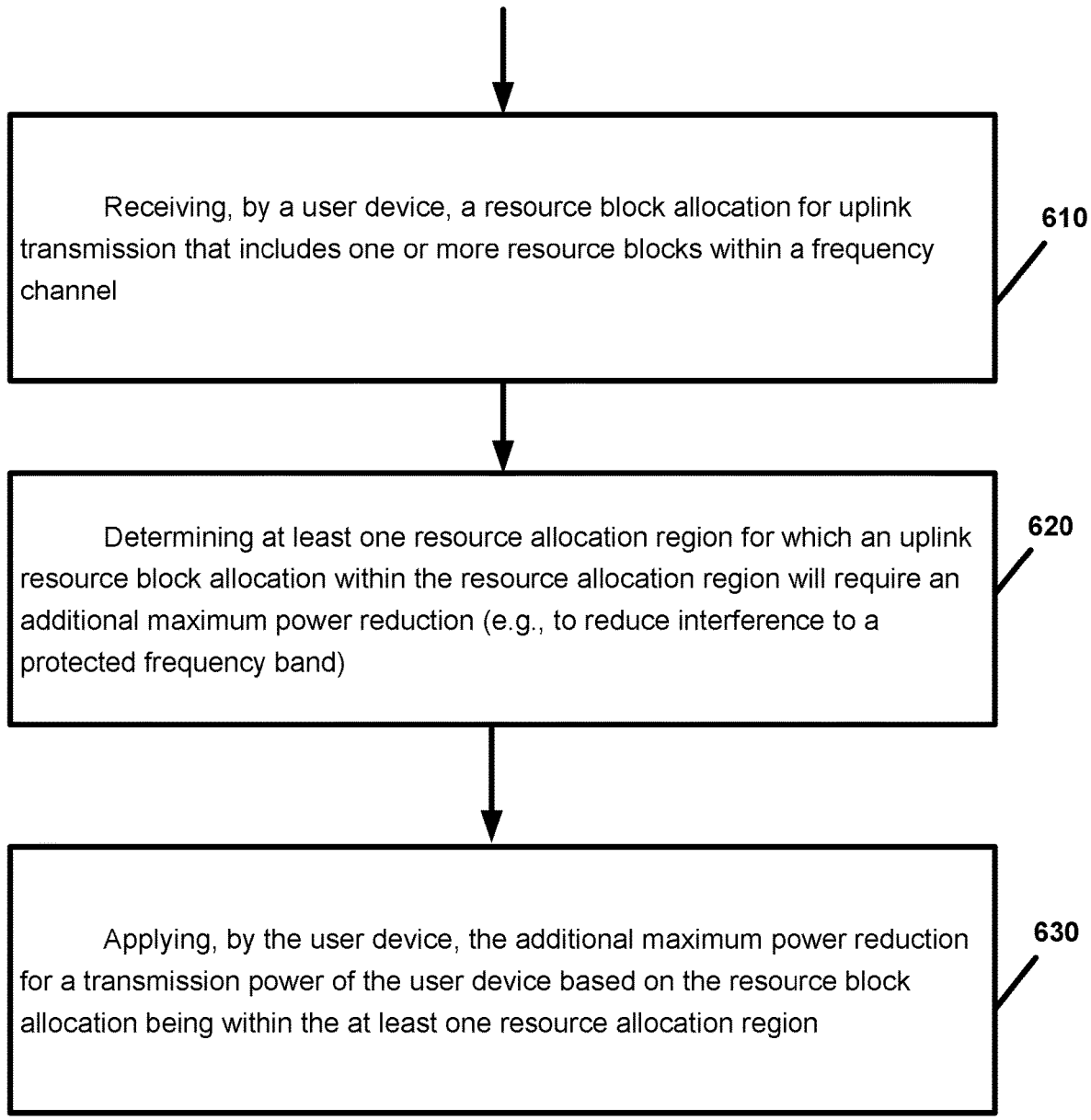
FIG. 6 is a flow chart illustrating operation of a user device/UE according to an example embodiment. Another diagram illustrating corresponding MPR inner zone and outer zone, which may also correspond to FIG. 4, according to another example implementation.

Example 1: FIG. 6 is a flow chart illustrating operation of a user device (UE) according to an example implementation. The method may be directed to a method of power control that uses one or more equations and/or inequalities to determine whether an additional maximum power reduction will be used for a user device transmission power for a plurality of channel bandwidths and/or a plurality of resource block bandwidths, the method including several operations. Operation 610 includes receiving, by a user device, a resource block allocation for uplink transmission that includes one or more resource blocks within a frequency channel. Operation 620 includes determining at least one resource allocation region for which an uplink resource block allocation within the resource allocation region will require an additional maximum power reduction. Operation 630 includes applying, by the user device, the additional maximum power reduction for a transmission power of the user device based on the resource block allocation being within the at least one resource allocation region.

Example 2: According to an example embodiment, operation 620 may include determining at least one resource allocation region for which an uplink resource block allocation within the resource allocation region will require an additional maximum power reduction to reduce interference to a protected frequency band.

Example 3: According to an example implementation of the method of any of examples 1-2, wherein the at least one resource allocation region comprises a plurality of non-overlapping resource allocation regions, wherein the applying comprises: determining that the resource block allocation region is within a first resource allocation region of the plurality of non-overlapping resource allocation regions; and applying, by the user device, the additional maximum power reduction for a transmission power of the user device based on the resource block allocation being within the first resource allocation region.

Example 4: According to an example implementation of the method of any of example 2, wherein the applying comprises: applying, based on the following: 1) the resource block allocation is within the at least one resource allocation region, and 2) the frequency channel has a frequency offset

TABLE 1

Parameters for region edges and frequency offsets.

| Parameter | Symbol | Value OFDM | Value DFT-S-OFDM | Related condition |
|---|---|---|---|---|
| Allocation start | $f_{start,max,IMD3}$ | 0.33 $BW_{Channel}$ | | $RB_{start} \leq f_{start,max,IMD3}/RBW$ |
| Allocation BW in IMD3 region | $AW_{max,IMD3}$ | 4 MHz | | $L_{CRB} \leq AW_{max,IMD3}/RBW$ |
| Max freq. offset in IMD3 region | $\text{offset}_{max,IMD3}$ | $BW_{Channel}$ − 6 MHz | | |
| Freq. offset in IMD3 region | $\text{offset}_{IDM3}$ | $\text{offset}_{max,IMD3}$ − 3 RBW · $RB_{start}$ | | $Fc - BW_{Channel}/2 \geq F_{UL\_low} + \text{offset}_{IMD3}$ |
| Right edge of regrowth region | $\Delta_{start}$ | 0.02 $BW_{Channel}$ | 0.08 $BW_{Channel}$ | $RB_{start} \leq L_{CRB}/2 + \Delta_{start}/RBW$ |
| Allocation BW in regrowth region | $AW_{max,regrowth}$ | 61 MHz | | $L_{CRB} \leq AW_{max,regrowth}/RBW$ |
| Freq. offset in regrowth region | $\text{offset}_{regrowth}$ | 10 MHz | | $Fc - BW_{channel}/2 \geq F_{UL\_low} + \text{offset}_{regrowth}$ |

TABLE 2

Symbols

| Symbol | Definition |
|---|---|
| $BW_{Channel}$ | Channel bandwidth |
| $F_C$ | Centre frequency of channel |
| $F_{UL\_low}$ | The lower edge frequency of the uplink operating band |
| RBW | Resource block bandwidth |
| $RB_{start}$ | Index of lowest allocated resource block; $RB_{start}$ = 0 is the lowest RB in the channel. |
| $L_{CRB}$ | Number of contiguously allocated resource blocks |

TABLE 3

A-MPR values

| Access | Modulation | Back-off [dB] |
|---|---|---|
| DFT-S-OFDM | pi/2-BPSK | 1.5 |
| | QPSK | 2 |
| | 16-QAM | 2.5 |
| OFDM | QPSK | 4 |
| | 16-QAM | 4 |
| | Any other | 0 |

Example Proposal: The A-MPR (back-off) is defined as max(MPR, A-MPR).

if $RB_{start} \leq f_{start,max,IMD3}/RBW$
and $L_{CRB} \leq A\ W_{max,IMD3}/RBW$
and $F_C - BW_{Channel}/2 < F_{UL\_low} + \text{offset}_{IMD3}$,
then
the A-MPR (back-off) is defined according to Table 3,
else, if $RB_{start} \leq L_{CRB}/2 + \Delta_{start}/RBW$ from an edge of the protected frequency band that is less than a threshold frequency offset of the at least one resource allocation region.

Example 5: According to an example implementation of the method of any of examples 1-4, wherein an amount of additional maximum power reduction applied by the user device is a function of the frequency offset of the frequency channel.

Example 6: According to an example implementation of the method of any of examples 1-5, wherein the applying comprising apply, by the user device, a first amount of additional maximum power reduction where the frequency channel has a first frequency offset that is less than the threshold frequency offset, and the user device applies a second amount, less than the first amount, of additional maximum power reduction where the frequency channel has a second frequency offset that is greater than or equal to the threshold frequency offset.

Example 7: According to an example implementation of the method of any of examples 1-6, wherein a larger additional maximum power reduction is applied by the user device for a smaller frequency offset, and a smaller additional maximum power reduction is applied by the user device for a larger frequency offset of the frequency channel.

Example 8: According to an example implementation of the method of any of examples 1-7, wherein the at least one resource allocation region comprises a plurality of resource allocation regions, wherein each resource allocation region has an associated threshold frequency offset.

Example 9: According to an example implementation of the method of any of examples 1-8, wherein the at least one resource allocation region comprises a plurality of resource allocation regions, wherein allocation region borders, a threshold frequency offset and an additional maximum power reduction are defined for each of the plurality of resource allocation regions.

Example 10: According to an example implementation of the method of any of examples 1-9, wherein each threshold frequency offset is based upon a bandwidth of the frequency channel.

Example 11: According to an example implementation of the method of any of examples 1-10, wherein the applying comprises controlling, by the user device, a transmission power of the user device for uplink transmission via the resource block allocation by reducing the maximum transmission power of the user device by the additional maximum power reduction.

Example 12: According to an example implementation of the method of any of examples 1-11, wherein the applying maximum power reduction comprises: determining an adjusted maximum transmission power based on the maximum power reduction; and controlling, by the user device, the transmission power of the user device for uplink transmission within a power range that is less than or equal to the maximum transmission power.

Example 13: According to an example implementation of the method of any of examples 1-12, wherein the resource allocation region comprises at least one of the following: a resource allocation region in which transmission power of the user device is limited by intermodulation distortion to reduce interference to the protected frequency band; and, a resource allocation region in which transmission power of the user device is limited by spectral regrowth to reduce interference to the protected frequency band.

Example 14: According to an example implementation of the method of any of examples 1-12, wherein the receiving, by the user device, a resource block allocation for uplink transmission comprises: receiving information indicating at least a size or width of the resource block allocation, and a position of the resource block allocation within the channel.

Example 15: An apparatus comprising means for performing a method of any of examples 1-14.

Example 16: An apparatus comprising at least one processor and at least one memory including computer instructions that, when executed by the at least one processor, cause the apparatus to perform a method of any of examples 1-14.

Example 17: An apparatus comprising a computer program product including a non-transitory computer-readable storage medium and storing executable code that, when executed by at least one data processing apparatus, is configured to cause the at least one data processing apparatus to perform a method of any of examples 1-14.

Example 18: An apparatus comprising at least one processor and at least one memory including computer instructions that, when executed by the at least one processor, cause the apparatus to: perform, by a user device, power control using one or more equations and/or inequalities to determine whether an additional maximum power reduction will be used for the user device transmission power for a plurality of channel bandwidths and/or a plurality of resource block bandwidths, including being configured to cause the apparatus to: receive, by a user device, a resource block allocation for uplink transmission that includes one or more resource blocks within a frequency channel; determine at least one resource allocation region for which an uplink resource block allocation within the resource allocation region will require an additional maximum power reduction; and apply, by the user device, the additional maximum power reduction for a transmission power of the user device based on the resource block allocation being within the at least one resource allocation region.

Figure 7:
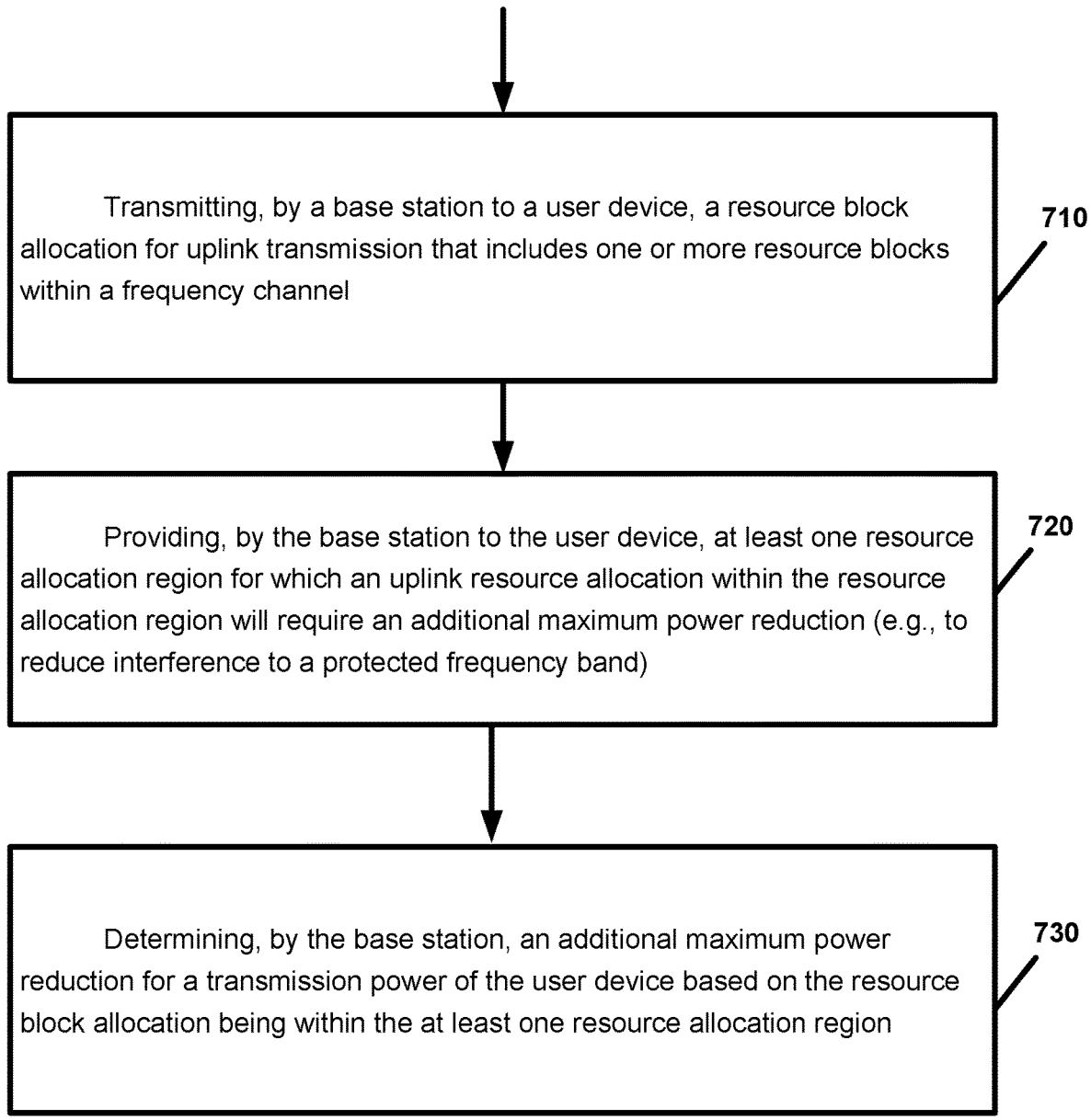
FIG. 7 is a flow chart illustrating operation of a base station according to an example embodiment.

Example 19: FIG. 7 is a flow chart illustrating operation of a base station according to an example embodiment. The flow chart of FIG. 7 is directed to a method of power control that uses one or more equations and/or inequalities to determine whether an additional maximum power reduction will be used for a user device transmission power for a plurality of channel bandwidths and/or a plurality of resource block bandwidths, the method including several operations. Operation 710 includes transmitting, by a base station to a user device, a resource block allocation for uplink transmission that includes one or more resource blocks within a frequency channel. Operation 720 includes providing, by the base station to the user device, at least one resource allocation region for which an uplink resource allocation within the resource allocation region will require an additional maximum power reduction. Operation 730 includes determining, by the base station, an additional maximum power reduction for a transmission power of the user device based on the resource block allocation being within the at least one resource allocation region.

Example 20: According to an example embodiment, operation 720 may include providing, by the base station to the user device, at least one resource allocation region for which an uplink resource allocation within the resource allocation region will require an additional maximum power reduction to reduce interference to a protected frequency band.

Example 21: According to an example implementation of the method of example 20, wherein the applying comprises: determining, by the base station, an additional maximum power reduction for a transmission power of the user device based on both: 1) the resource block allocation is within the at least one resource allocation region, and 2) the frequency channel has a frequency offset from an edge of the protected frequency band that is less than a threshold frequency offset of the at least one resource allocation region.

Example 22: According to an example implementation of the method of any of examples 20-21, wherein the at least one resource allocation region comprises a plurality of resource allocation region, wherein each resource allocation region has an associated threshold frequency offset.

Example 23: According to an example implementation of the method of any of examples 19-22, wherein the at least one resource allocation region comprises a plurality of resource allocation regions, wherein allocation region borders, a threshold frequency offset and an additional maximum power reduction are defined for each of the plurality of resource allocation regions.

Example 24: According to an example implementation of the method of any of examples 19-23, wherein each threshold frequency offset is based upon a bandwidth of the frequency channel.

Example 25: According to an example implementation of the method of any of examples 19-24, and further comprising: receiving, by the base station from the user device, a transmission via the resource block allocation having a transmission power in which a maximum transmission power of the user device has been reduced by the additional maximum power reduction.

Example 26: According to an example implementation of the method of any of examples 20-25, wherein the resource allocation region comprises at least one of the following a resource allocation region in which transmission power of the user device is limited by intermodulation distortion to reduce interference to the protected frequency band; and, a resource allocation region in which transmission power of the user device is limited by spectral regrowth to reduce interference to the protected frequency band.

Example 27: According to an example implementation of the method of any of examples 19-26, wherein the providing, by the base station to the user device, a resource block allocation for uplink transmission comprises: transmitting, by the base station to the user device, information indicating at least a size or width of the resource block allocation, and a position of the resource block allocation within the frequency channel.

Example 28: An apparatus comprising means for performing a method of any of examples 19-27.

Example 29: An apparatus comprising at least one processor and at least one memory including computer instructions that, when executed by the at least one processor, cause the apparatus to perform a method of any of examples 19-27.

Example 30: An apparatus comprising a computer program product including a non-transitory computer-readable storage medium and storing executable code that, when executed by at least one data processing apparatus, is configured to cause the at least one data processing apparatus to perform a method of any of examples 19-27.

Example 31: An apparatus comprising at least one processor and at least one memory including computer instructions that, when executed by the at least one processor, cause the apparatus to determine an additional maximum power reduction for a user device using one or more equations and/or inequalities to determine whether an additional maximum power reduction will be used for the user device transmission power for a plurality of channel bandwidths and/or a plurality of resource block bandwidths, including being configured to cause the apparatus to: transmit, by a base station to a user device, a resource block allocation for uplink transmission that includes one or more resource blocks within a frequency channel; provide, by the base station to the user device, at least one resource allocation region for which an uplink resource allocation within the resource allocation region will require an additional maximum power reduction; and determine, by the base station, an additional maximum power reduction for a transmission power of the user device based on the resource block allocation being within the at least one resource allocation region.

Figure 8:
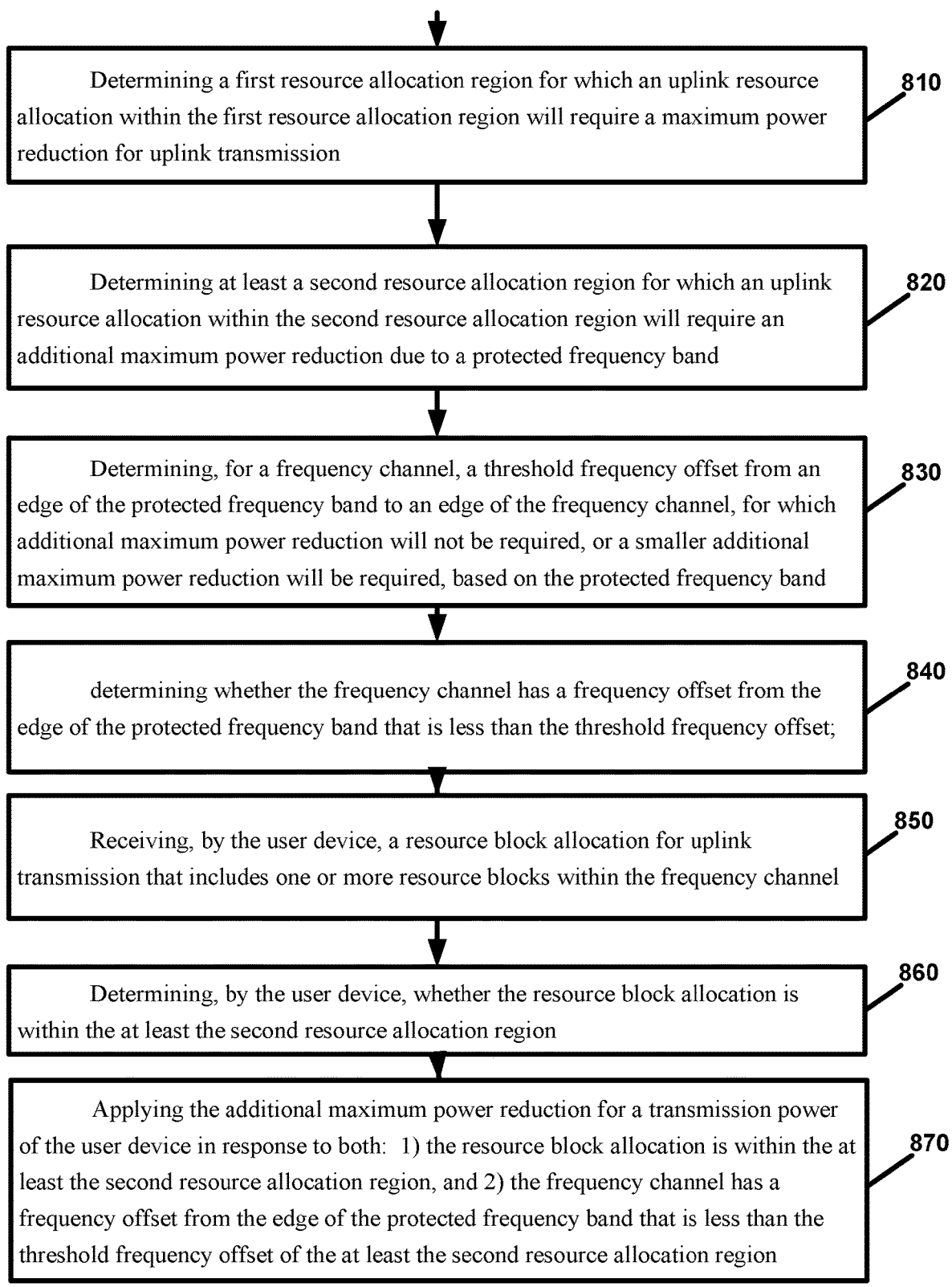
FIG. 8 is a flow chart illustrating operation of a user device/UE according to another example embodiment.

Example 32: FIG. 8 is a flow chart illustrating operation of a user device according to another example embodiment. The method of FIG. 8 is directed to a method of power control that uses one or more equations and/or inequalities to determine whether an additional maximum power reduction will be used for a user device transmission power for a plurality of channel bandwidths and/or a plurality of resource block bandwidths. Operation 810 includes determining a first resource allocation region for which an uplink resource allocation within the first resource allocation region will require a maximum power reduction for uplink transmission. Operation 820 includes determining at least a second resource allocation region for which an uplink resource allocation within the second resource allocation region will require an additional maximum power reduction due to a protected frequency band. Operation 830 includes determining, for a frequency channel, a threshold frequency offset from an edge of the protected frequency band to an edge of the frequency channel, for which additional maximum power reduction will not be required, or a smaller additional maximum power reduction will be required, based on the protected frequency band. Operation 840 includes determining whether the frequency channel has a frequency offset from the edge of the protected frequency band that is less than the threshold frequency offset. Operation 850 includes receiving, by the user device, a resource block allocation for uplink transmission that includes one or more resource blocks within the frequency channel. Operation 860 includes determining, by the user device, whether the resource block allocation is within the at least the second resource allocation region; operation 870 includes applying the additional maximum power reduction for a transmission power of the user device in response to both: 1) the resource block allocation is within the at least the second resource allocation region, and 2) the frequency channel has a frequency offset from the edge of the protected frequency band that is less than the threshold frequency offset of the at least the second resource allocation region.

Example 33: An apparatus comprising means for performing a method of example 32.

Example 34: An apparatus comprising at least one processor and at least one memory including computer instructions that, when executed by the at least one processor, cause the apparatus to perform a method of example 32.

Example 35: An apparatus comprising a computer program product including a non-transitory computer-readable storage medium and storing executable code that, when executed by at least one data processing apparatus, is configured to cause the at least one data processing apparatus to perform a method of example 32.

Example 34: The method of any of examples 1-14 wherein one or more of the following equations or inequalities are used to determine when to apply additional maximum power reduction:

if $RB_{start} \leq f_{start,max,IMD3}/RBW$
and $L_{CRB} \leq A\ W_{max,IMD3}/RBW$
and $F_C - BW_{Channel}/2 < F_{UL\_low} + \text{offset}_{IMD3}$, then additional maximum power reduction is applied; and/or else, if $RB_{start} \leq L_{CRB}/2+\Delta_{start}/RBW$
and $L_{CRB} \leq A\ W_{max,regrowth}/RBW$
and $F_C-BW_{Channel}/2 < F_{UL\_low}+\text{offset}_{regrowth}$,
then additional maximum power reduction is applied.

Example 35: The method of any of examples 1-14 wherein one or more of the following equations or inequalities are used to determine when to apply additional maximum power reduction:

$RB_{start} \leq f_{start,max,IMD3}/RBW$;
$L_{CRB} \leq A\ W_{max,IMD3}/RBW$;
$F_C-BW_{Channel}/2 < F_{UL\_low}+\text{offset}_{IMD3}$;
$RB_{start} \leq L_{CRB}/2+\Delta_{start}/RBW$;
$L_{CRB} \leq A\ W_{max,regrowth}/RBW$; and/or
$F_C-BW_{Channel}/2 < F_{UL\_low}+\text{offset}_{regrowth}$.

Figure 9:
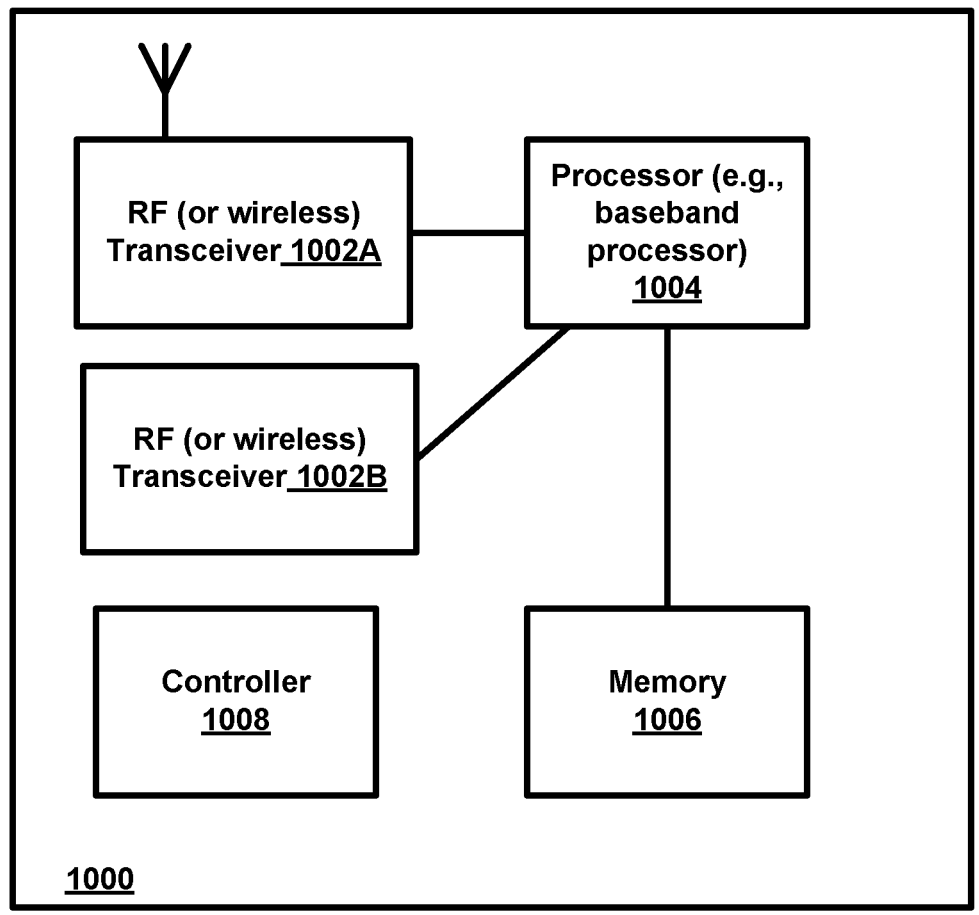
FIG. 9 is a block diagram of a node or wireless station (e.g., base station/access point or mobile station/user device) according to an example implementation.

FIG. 9 is a block diagram of a wireless station (e.g., AP, BS, relay node, eNB, UE or user device) 1000 according to an example implementation. The wireless station 1000 may include, for example, one or two RF (radio frequency) or wireless transceivers 1002A, 1002B, where each wireless transceiver includes a transmitter to transmit signals and a receiver to receive signals. The wireless station also includes a processor or control unit/entity (controller) 1004 to execute instructions or software and control transmission and receptions of signals, and a memory 1006 to store data and/or instructions.

Processor 1004 may also make decisions or determinations, generate frames, packets or messages for transmission, decode received frames or messages for further processing, and other tasks or functions described herein. Processor 1004, which may be a baseband processor, for example, may generate messages, packets, frames or other signals for transmission via wireless transceiver 1002 (1002A or 1002B). Processor 1004 may control transmission of signals or messages over a wireless network, and may control the reception of signals or messages, etc., via a wireless network (e.g., after being down-converted by wireless transceiver 1002, for example).

Processor 1004 may be programmable and capable of executing software or other instructions stored in memory or on other computer media to perform the various tasks and functions described above, such as one or more of the tasks or methods described above. Processor 1004 may be (or may include), for example, hardware, programmable logic, a programmable processor that executes software or firmware, and/or any combination of these. Using other terminology, processor 1004 and transceiver 1002 together may be considered as a wireless transmitter/receiver system, for example.

In addition, referring to FIG. 9, a controller (or processor) 1008 may execute software and instructions, and may provide overall control for the station 1000, and may provide control for other systems not shown in FIG. 9, such as controlling input/output devices (e.g., display, keypad), and/or may execute software for one or more applications that may be provided on wireless station 1000, such as, for example, an email program, audio/video applications, a word processor, a Voice over IP application, or other application or software.

In addition, a storage medium may be provided that includes stored instructions, which when executed by a controller or processor may result in the processor 1004, or other controller or processor, performing one or more of the functions or tasks described above.

According to another example implementation, RF or wireless transceiver(s) 1002A/1002B may receive signals or data and/or transmit or send signals or data. Processor 1004 (and possibly transceivers 1002A/1002B) may control the RF or wireless transceiver 1002A or 1002B to receive, send, broadcast or transmit signals or data.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks may utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations may be distributed among a plurality of servers, nodes or hosts. It should also be understood that the distribution of labour between core network operations and base station operations may differ from that of the LTE or even be non-existent.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (TOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, byway of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

ACLR Adjacent Channel Leakage Ratio
BPSK Binary Phase Shift Keying
CA Carrier Aggregation
CP-OFDM Cyclic Prefix Orthogonal Frequency Multiplexing
DFT-S Discrete Fourier Transform Spreading
eMTC enhanced Machine Type Communications
EVM Error Vector Magnitude
LCRB Length of contiguous resource block allocation
LCRBmax Maximum length of contiguous resource block allocation for a given channel bandwidth
LTE Long Term Evolution
MPR Maximum Power Reduction
NB-IoT Narrowband Internet of Things
NR New Radio
QAM Quadrature Amplitude Modulation
QPSK Quadrature Phase Shift Keying
RB Resource Block
SEM Spectrum Emission Mask
SIB System Information Block

The invention claimed is:

1. An apparatus comprising at least one processor and at least one memory storing instructions that, when executed by the at least one processor, cause the apparatus to:
    perform power control using a plurality of criteria to determine whether an additional maximum power reduction will be applied to a transmission power for at least one of one or more channel bandwidths or one or more resource block bandwidths;
    receive a resource block allocation for uplink transmission that includes one or more resource blocks within a frequency channel;
    determine at least one resource allocation region for which an uplink resource block allocation within the resource allocation region will require an additional maximum power reduction, wherein the at least one resource allocation region comprises a plurality of non-overlapping resource allocation regions;
    determine that the uplink resource block allocation region is within a first resource allocation region of the plurality of non-overlapping resource allocation regions; and
    cause application of the additional maximum power reduction for the transmission power based on the resource block allocation being within the first resource allocation region of the plurality of non-overlapping resource allocation regions.

2. The apparatus of claim 1, wherein causing the apparatus to determine comprises causing the apparatus to:

determine at least one resource allocation region for which an uplink resource block allocation within the resource allocation region will require an additional maximum power reduction to reduce interference to a protected frequency band.

3. The apparatus of claim 2, wherein causing the apparatus to apply comprises causing the apparatus to:
apply, based on whether 1) the resource block allocation is within the at least one resource allocation region, or 2) the frequency channel has a frequency offset from an edge of the protected frequency band that is less than a threshold frequency offset of the at least one resource allocation region.

4. The apparatus of claim 1, wherein an amount of additional maximum power reduction applied by the apparatus is a function of the frequency offset of the frequency channel.

5. The apparatus of claim 1, wherein causing the apparatus to apply comprises causing the apparatus to perform a first amount of additional maximum power reduction, where the frequency channel has a first frequency offset that is less than the threshold frequency offset, and the apparatus applies a second amount, less than the first amount, of additional maximum power reduction where the frequency channel has a second frequency offset that is greater than or equal to the threshold frequency offset.

6. The apparatus of claim 5, wherein a larger additional maximum power reduction is applied for a smaller frequency offset, and a smaller additional maximum power reduction is applied for a larger frequency offset of the frequency channel.

7. The apparatus of claim 1, wherein the at least one resource allocation region comprises a plurality of resource allocation regions, wherein each resource allocation region has an associated threshold frequency offset.

8. The apparatus of claim 1, wherein the at least one resource allocation region comprises a plurality of resource allocation regions, wherein allocation region borders, a threshold frequency offset and an additional maximum power reduction are defined for each of the plurality of resource allocation regions.

9. The apparatus of claim 1, wherein each threshold frequency offset is based upon a bandwidth of the frequency channel.

10. The apparatus of claim 1, wherein causing the apparatus to apply comprises causing the apparatus to:
control the transmission power for uplink transmission via the resource block allocation by reducing the maximum transmission power of the apparatus by the additional maximum power reduction.

11. The apparatus of claim 1, wherein causing the apparatus to apply maximum power reduction comprises causing the apparatus to:
determine an adjusted maximum transmission power based on the maximum power reduction; and
control the apparatus' transmission power for uplink transmission within a power range that is less than or equal to the maximum transmission power.

12. The apparatus of claim 1, wherein the resource allocation region comprises at least one of the following:
a resource allocation region in which transmission power of the apparatus is limited by intermodulation distortion to reduce interference to the protected frequency band; or
a resource allocation region in which transmission power of the apparatus is limited by spectral regrowth to reduce interference to the protected frequency band.

13. The apparatus of claim 1, wherein the apparatus comprises a user equipment.

14. The apparatus of claim 13, further comprising:
a transceiver configured to receive the resource block allocation for uplink transmission that includes the one or more resource blocks within the frequency channel 15. The apparatus of claim 13, further comprising:
a transceiver configured to apply the additional maximum power reduction for the transmission power.

16. A method of power control that uses a plurality of criteria to determine whether an additional maximum power reduction will be applied to a transmission power for at least one of one or more channel bandwidths or one or more resource block bandwidths, the method comprising:
receiving a resource block allocation for uplink transmission that includes one or more resource blocks within a frequency channel;
determining at least one resource allocation region for which an uplink resource block allocation within the resource allocation region will require an additional maximum power reduction; and
applying the additional maximum power reduction for the transmission power based on the resource block allocation being within the at least one resource allocation region,
wherein the plurality of criteria comprise:
$RB_{start} \le f_{start,max,IMD3}/RBW$,
$L_{CRB} \le AW_{max,IMD3}/RBW$, and
$F_C - BW_{Channel}/2 < F_{UL\_low} + \text{offset}_{IMD3}$,
wherein
RBW is a resource block bandwidth,
$RB_{start}$ is an index of lowest allocated resource block,
$L_{CRB}$ is a number of contiguously allocated resource blocks,
$F_C$ is a center frequency of a channel,
$BW_{Channel}$ is a channel bandwidth,
$F_{start,max,IMD3}$ is a start of an allocation,
$AW_{max,IMD3}$ is an allocation width in IMD3 region,
$F_{UL\_low}$ is a lower edge frequency of an uplink operating band, and
$\text{offset}_{IMD3}$ is a frequency offset in an IMD3 region.

17. The method of claim 16, wherein the plurality of criteria further comprise:
$RB_{start} \le L_{CRB}/2 + \Delta_{start}/RBW$,
$L_{CRB} \le AW_{max,regrowth}/RBW$, and
$F_C - BW_{Channel}/2 < F_{UL\_low} + \text{offset}_{regrowth}$,
wherein:
$\Delta_{start}$ is a right edge of a regrowth region,
$AW_{max,regrowth}$ is an allocation bandwidth in the regrowth region, and
$\text{offset}_{regrowth}$ is a frequency offset in the regrowth region.

18. An apparatus comprising at least one processor and at least one memory storing instructions that, when executed by the at least one processor, cause the apparatus to:
perform power control using a plurality of criteria to determine whether an additional maximum power reduction will be applied to a transmission power for at least one of one or more channel bandwidths or one or more resource block bandwidths;
receive a resource block allocation for uplink transmission that includes one or more resource blocks within a frequency channel;
determine at least one resource allocation region for which an uplink resource block allocation within the resource allocation region will require an additional maximum power reduction; and apply the additional maximum power reduction for the transmission power based on the resource block allocation being within the at least one resource allocation region;

wherein the plurality of criteria comprise:
$RB_{start} \leq f_{start,max,IMD3}/RBW$,
$L_{CRB} \leq AW_{max,IMD3}/RBW$, and
$F_C - BW_{Channel}/2 < F_{UL\_low} + offset_{IMD3}$, wherein:
RBW is a resource block bandwidth,
RB start is an index of lowest allocated resource block,
$L_{CRB}$ is a number of contiguously allocated resource blocks,
$F_C$ is a center frequency of a channel,
$BW_{Channel}$ is a channel bandwidth,
$f_{start,max,IMD3}$ is a start of an allocation,
$AW_{max,IMD3}$ is an allocation width in an IMD3 region,
$F_{UL\_low}$ is a lower edge frequency of an uplink operating band, and
$offset_{IMD3}$ is a frequency offset in the IMD3 region.

19. The apparatus of claim 18, wherein the plurality of criteria further comprise:
$RB_{start} \leq L_{CRB}/2 + \Delta_{start}/RBW$,
$L_{CRB} \leq AW_{max,regrowth}/RBW$, and
$F_C - BW_{Channel}/2 < F_{UL\_low} + offset_{regrowth}$, wherein:
$\Delta_{start}$ is a right edge of a regrowth region,
$AW_{max,regrowth}$ is an allocation bandwidth in the regrowth region, and
$offset_{regrowth}$ is a frequency offset in the regrowth region.

20. An apparatus comprising at least one processor and at least one memory storing instructions that, when executed by the at least one processor, cause the apparatus to:

perform power control using a plurality of criteria to determine whether an additional maximum power reduction will be used for an apparatus transmission power for at least one of one or more channel bandwidths or one or more resource block bandwidths;

receive a resource block allocation for uplink transmission that includes one or more resource blocks within a frequency channel;

determine at least one resource allocation region for which an uplink resource block allocation within the resource allocation region will require an additional maximum power reduction; and apply the additional maximum power reduction to the apparatus transmission power based on the resource block allocation being within the at least one resource allocation region, wherein the plurality of criteria comprise:
$RB_{start} \leq f_{start,max,IMD3}/RBW$,
$L_{CRB} \leq AW_{max,IMD3}/RBW$, and
$F_C - BW_{Channel}/2 < F_{UL\_low} + offset_{IMD3}$, wherein:
RBW is a resource block bandwidth,
$RB_{start}$ is an index of lowest allocated resource block,
$L_{CRB}$ is a number of contiguously allocated resource blocks,
$F_C$ is a center frequency of a channel,
$BW_{Channel}$ is a channel bandwidth,
$f_{start,max,IMD3}$ is a start of an allocation,
$AW_{max,IMD3}$ is an allocation width in an IMD3 region,
$F_{UL\_low}$ is a lower edge frequency of an uplink operating band, and
$offset_{IMD3}$ is a frequency offset in the IMD3 region.

21. The apparatus of claim 20, wherein the plurality of criteria further comprise:
$RB_{start} \leq L_{CRB}/2 + \Delta_{start}/RBW$,
$L_{CRB} \leq AW_{max,regrowth}/RBW$, and
$F_C - BW_{Channel}/2 < F_{UL\_low} + offset_{regrowth}$, wherein:
$\Delta_{start}$ is a right edge of a regrowth region,
$AW_{max,regrowth}$ is an allocation bandwidth in the regrowth region, and
$offset_{regrowth}$ is a frequency offset in the regrowth region.

22. A method comprising:

performing power control using a plurality of criteria to determine whether an additional maximum power reduction will be applied to a transmission power for at least one of: one or more channel bandwidths or one or more resource block bandwidths;

receiving a resource block allocation for uplink transmission that includes one or more resource blocks within a frequency channel;

determining at least one resource allocation region for which an uplink resource block allocation within the resource allocation region will require an additional maximum power reduction, wherein the at least one resource allocation region comprises a plurality of non-overlapping resource allocation regions;

determining that the uplink resource block allocation region is within a first resource allocation region of the plurality of non-overlapping resource allocation regions; and applying the additional maximum power reduction for the transmission power based on the resource block allocation being within the first resource allocation region of the plurality of non-overlapping resource allocation regions.

* * * * *

UNITED STATES PATENT AND TRADEMARK OFFICE
CERTIFICATE OF CORRECTION

PATENT NO. : 11,463,965 B2  
APPLICATION NO. : 16/982386  
DATED : October 4, 2022  
INVENTOR(S) : Antti Piipponen et al.

Page 1 of 1

It is certified that error appears in the above-identified patent and that said Letters Patent is hereby corrected as shown below:

In the Drawings

In sheet 8 of 9, FIG. 8, and on the title page, the illustrative print figure, reference numeral "840", Line 2, delete "offset;" and insert -- offset --, therefor.

In the Claims

In Column 24, Line 6, Claim 14, delete "channel" and insert -- channel. --, therefor.

In Column 25, Line 29, Claim 19, delete "$AW_{max,regrowth}$" and insert -- $AW_{max,regrowth}$ --, therefor.

Signed and Sealed this  
Fourth Day of July, 2023

Katherine Kelly Vidal  
*Director of the United States Patent and Trademark Office*